(12) United States Patent
Alpern et al.

(10) Patent No.: US 7,793,265 B2
(45) Date of Patent: *Sep. 7, 2010

(54) METHOD, APPARATUS AND COMPUTER PROGRAM PRODUCT FOR OPTIMIZING FILE ACCESSES FOR AN APPLICATION EXECUTING IN A VIRTUAL CONTAINER

(75) Inventors: Bowen L. Alpern, Peekskill, NY (US); Glenn Ammons, Albany, NY (US); Vasanth Bala, Rye, NY (US); Johannes C. Laffra, Raleigh, NC (US); Todd W. Mummert, Danbury, CT (US); Darrell Christopher Reimer, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 322 days.

This patent is subject to a terminal disclaimer.

(21) Appl. No.: 11/757,511

(22) Filed: Jun. 4, 2007

(65) Prior Publication Data

US 2008/0301140 A1 Dec. 4, 2008

(51) Int. Cl.
*G06F 9/44* (2006.01)
*G06F 9/45* (2006.01)
(52) U.S. Cl. .................. 717/127; 717/159; 717/174
(58) Field of Classification Search .................. None
See application file for complete search history.

(56) References Cited

U.S. PATENT DOCUMENTS 5,933,626 A * 8/1999 Mahalingaiah et al. ...... 712/227
6,202,121 B1 * 3/2001 Walsh et al. ................. 711/100

(Continued)

OTHER PUBLICATIONS

Peter M. Chen and Brian D. Noble, "When Virtual Is Better Than Real", 2001, Proceedings of the 2001 Workshop on Hot Topics in Operating, cs.toronto.edu.*

Greg Shultz Windows Vista: SuperFetch and External Memory Devices Feb. 16, 2006 TechRepublic http://articles.techrepublic.com.com/5100-10878_11-6039379.html.*

(Continued)

*Primary Examiner*—Neveen Abel Jalil
*Assistant Examiner*—Polina Peach
(74) *Attorney, Agent, or Firm*—Harrington & Smith

(57) ABSTRACT

Disclosed is a method, apparatus and a computer program of a virtual execution environment. In one aspect thereof a data processor includes a disk-based storage system and a virtual machine monitor configured to execute a program in a virtual container. The virtual machine monitor is responsive, prior to execution of the application, to record a set of files accessed during a phase change in the disk-based storage system in a manner predetermined to minimize the time needed to retrieve the set of files. The virtual machine monitor is further responsive, at the occurrence of the phase change, or prior to the occurrence of a phase change if the files are prefetched, to retrieve the files from the disk-based storage system. In a further aspect thereof there is provided a server of the virtual execution environment that includes a unit, responsive to receiving notification from the at least one virtual machine monitor of an occurrence of contemporaneous file accesses not associated with a known phase change of a virtual container, for evaluating the occurrence as a candidate phase change and, responsive to the evaluation indicating a presence of a previously unknown phase change, for adding a list of the files accessed to a phase change template for use by the same or a different virtual machine monitor during another instance of execution of the application.

17 Claims, 3 Drawing Sheets

U.S. PATENT DOCUMENTS

| | | | | |
|---|---|---|---|---|
| 6,298,381 | B1 * | 10/2001 | Shah et al. | 709/228 |
| 6,442,585 | B1 * | 8/2002 | Dean et al. | 718/108 |
| 7,062,567 | B2 | 6/2006 | Benitez et al. | 709/231 |
| 7,356,679 | B1 * | 4/2008 | Le et al. | 713/1 |
| 2005/0262502 | A1 * | 11/2005 | Lari et al. | 717/175 |
| 2006/0047974 | A1 | 3/2006 | Alpern et al. | 713/191 |
| 2007/0162957 | A1 * | 7/2007 | Bartels | 726/2 |

OTHER PUBLICATIONS

Vasanth Bala, Evelyn Duesterwald, Sanjeev Banerjia Dynamo: A Transparent Dynamic Optimization System 2000 Hewlett-Packard Labs 1 Main Street, Cambridge, MA 02142.*

PDS: A Virtual Execution Environment for Software Deployment, Bowen Alpern, et al., VEE '05, Jun. 11-12, 2005, Chicago, Illinois, USA, 11pgs.

* cited by examiner

US 7,793,265 B2

METHOD, APPARATUS AND COMPUTER PROGRAM PRODUCT FOR OPTIMIZING FILE ACCESSES FOR AN APPLICATION EXECUTING IN A VIRTUAL CONTAINER

STATEMENT OF GOVERNMENT RIGHTS

This invention was made with Government support under Contract No.: NBCH3039004 (DARPA) awarded by the Defense, Advanced Research Projects Agency. The Government has certain rights in this invention.

CROSS-REFERENCE TO A RELATED APPLICATION

This patent application is related to commonly-owned U.S. patent application Ser. No. 11/757,517, filed on even date herewith, by: Bowen L. Alpern, Glenn Ammons, Vasanth Bala, Johannes C. Laffra, Todd W. Mummert and Darrell Reimer, entitled: "Method, Apparatus and Computer Program Product for Optimizing Access to the Content of a Virtual Application Container on a Fixed, Read-Only Medium".

TECHNICAL FIELD

This invention relates generally to data processors and data processing methods and, more specifically, relates to data processor virtualization procedures and apparatus in the context of application virtualization and the optimization of file layout in memory that is based on information obtained during virtual execution of a corresponding application.

BACKGROUND

Virtual machines, particularly those that attempt to capture an entire machine's state, are increasingly being used as vehicles for deploying software, providing predictability and centralized control. The virtual environment provides isolation from the uncontrolled variability of target machines, particularly from potentially conflicting versions of prerequisite software. Skilled personnel assemble a self-contained software universe (potentially including the operating system) with all of the dependencies of an application, or suite of applications, correctly resolved. They then have confidence that this software will exhibit the same behavior on every machine, since a virtual machine monitor (VMM) will be interposed between it and the real machine.

Virtualization (system and application) technology has been gaining widespread commercial acceptance in recent years. System virtualization allows multiple operating system (OS) stacks to share common hardware resources such as memory and CPU. System virtualization is generally implemented as a mediation layer that operates between the OS and the hardware. Application level virtualization technologies allow multiple application stacks to share a common OS namespace, such as files and registry entries. Application level virtualization is generally implemented as a mediation layer that operates between the application processes and the OS. With system virtualization, an OS stack can be given the illusion that required hardware resources are available, whereas in reality they may be shared by multiple OS stacks. With application virtualization, an application can be given the illusion that its files and registry entries are exactly where it expects them to be on the host machine, whereas in reality multiple application install images may be sharing the same locations in the namespace.

General reference with regard to a virtual execution environment (one known as a Progressive Deployment System (PDS)) may be made to VEE '05, Jun. 11-12,2005, Chicago, Ill., USA, "PDS: A Virtual Execution Environment for Software Deployment", Bowen Alpern, Joshua Aurbach, Vasanth Bala, Thomas Frauenhofer, Todd Mummert, Michael Pigott.

The two types of virtualization technology (i.e., system and application) operate at different levels of the stack, and their value propositions are complimentary. System virtualization enables encapsulation of the state of a complete OS and applications software stack within a virtual system container, while application virtualization enables encapsulation of the state of an application stack only within a virtual application container. Both types of virtualization allow their respective containers to be deployed and managed as an appliance, i.e., as a pre-installed and pre-tested environment within a secure region that is isolated from other stacks that share the same environment. This has significant commercial value from an IT management standpoint, since appliances provide greater robustness and security assurances than conventional install-based methods of deployment.

During software execution some files are required more frequently than other files, and there can exist "phase" changes in which multiple files are required in a short period of time. Application start-up is one particularly important phase change.

Rotating data storage devices (e.g., magnetic disk) spin at a constant rate. This implies that those tracks farthest from the center of a disk can be read more quickly than those closer to the center. In addition, access to some disk sectors is faster than to others. It is known to exploit these characteristics by moving files observed to be accessed frequently to those disk sectors observed to be accessed quickly, thereby reducing disk latency and increasing the effective data transfer rate from disk.

If the files required for a phase change are widely separated, the seek-time to move from one file to the next can be a significant factor in the total time required to effect the phase change. This effect can manifest as an application appearing to take an inordinately long time to start. Existing products attempt to eliminate such effects by ordering files that are observed to be accessed within a short time window next to each other in the order that they were accessed. The effectiveness of this technique is limited by the fact that such products are unable to distinguish accesses that are accidentally contemporaneous from those that are necessarily so.

Windows™ has an API that allows user processes to move files on disk. Diskeeper's I-FAAST™ technology exploits this API to rearrange files on disk to avoid seek latencies for a file observed to be accessed contemporaneously. This technology is said to be specifically developed to accelerate the speed of file access time in order to meet the heavy workloads of file-intensive applications, and monitors file usage and reorganizes those files that are used most for the fastest users of applications such as CAD/CAM, database applications, and graphic and video-intensive applications are said to experience an increase in speed and response.

U.S. Pat. No. 7,062,567, Intelligent Network Streaming and Execution System for Conventionally Coded Applications, states in col. 31, lines 4-10, that "frequently accessed files can be reordered in the directory to allow faster lookup of the file information. This optimization is useful for directories with large number of files. When the client machine looks up a frequently used file in a directory, it finds this file early in the directory search. In an application run with many directory queries, the performance gain is significant." However, this technique is not disclosed to pertain to where the files are actually stored on disk.

SUMMARY

The foregoing and other problems are overcome, and other advantages are realized, in accordance with the exemplary embodiments of this invention.

In a first aspect thereof there is provided a method that comprises, prior to execution of a program in a virtual container, storing (recording) a set of files accessed during a phase change on a physical storage medium in a manner predetermined to minimize the time needed to retrieve the set of files; and at the occurrence of the phase change, or prior to the occurrence of a phase change if the files are prefetched, accessing the physical storage medium and retrieving the files.

In a second aspect thereof there is provided a tangible computer-readable storage medium that has recorded thereon data representing program instructions, the execution of which result in operations that include, prior to execution of a program in a virtual container, recording a set of files accessed during a phase change on a physical storage medium in a manner predetermined to minimize the time needed to retrieve the set of files and, at the occurrence of the phase change, or prior to the occurrence of a phase change if the files are prefetched, accessing the physical storage medium and retrieving the files.

In another aspect thereof there is provided a data processor that comprises a disk-based storage system and a virtual machine monitor configured to execute a program in a virtual container. The virtual machine monitor is responsive, prior to execution of the application, to store (record) a set of files accessed during a phase change in the disk-based storage system in a manner predetermined to minimize the time needed to retrieve the set of files. The virtual machine monitor is further responsive, at the occurrence of the phase change, or prior to the occurrence of a phase change if the files are prefetched, to retrieve the files from the disk-based storage system. The virtual machine monitor may, or may not, delegate to an OS some, or all, of the operations entailed in retrieving one or more files from the disk-based storage system.

In a further aspect thereof there is provided a server of a virtual execution environment that comprises at least one virtual machine monitor. The server includes means, responsive to receiving notification from the at least one virtual machine monitor of an occurrence of contemporaneous file accesses not associated with a known phase change of a virtual container, for evaluating the occurrence as a candidate phase change; and further includes means, responsive to the evaluation indicating a presence of a previously unknown phase change, for adding a list of the files accessed to a phase change template for use by the same or a different virtual machine monitor during another instance of execution of the application.

It should be noted that the phrase "prior to execution of the application" that appears above also encompasses a condition wherein the file placement occurs after the start of program execution, but before the indicated phase change.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION

The exemplary embodiments of this invention pertain to application virtualization, as well as to system virtualization. In particular, the exemplary embodiments of this invention provide a technique or techniques for the arrangement of files on disk in the context of virtual execution of an application using the files, and exploit the capabilities of virtual containers to make these techniques more effective in the context of virtual application execution.

Figure 1:
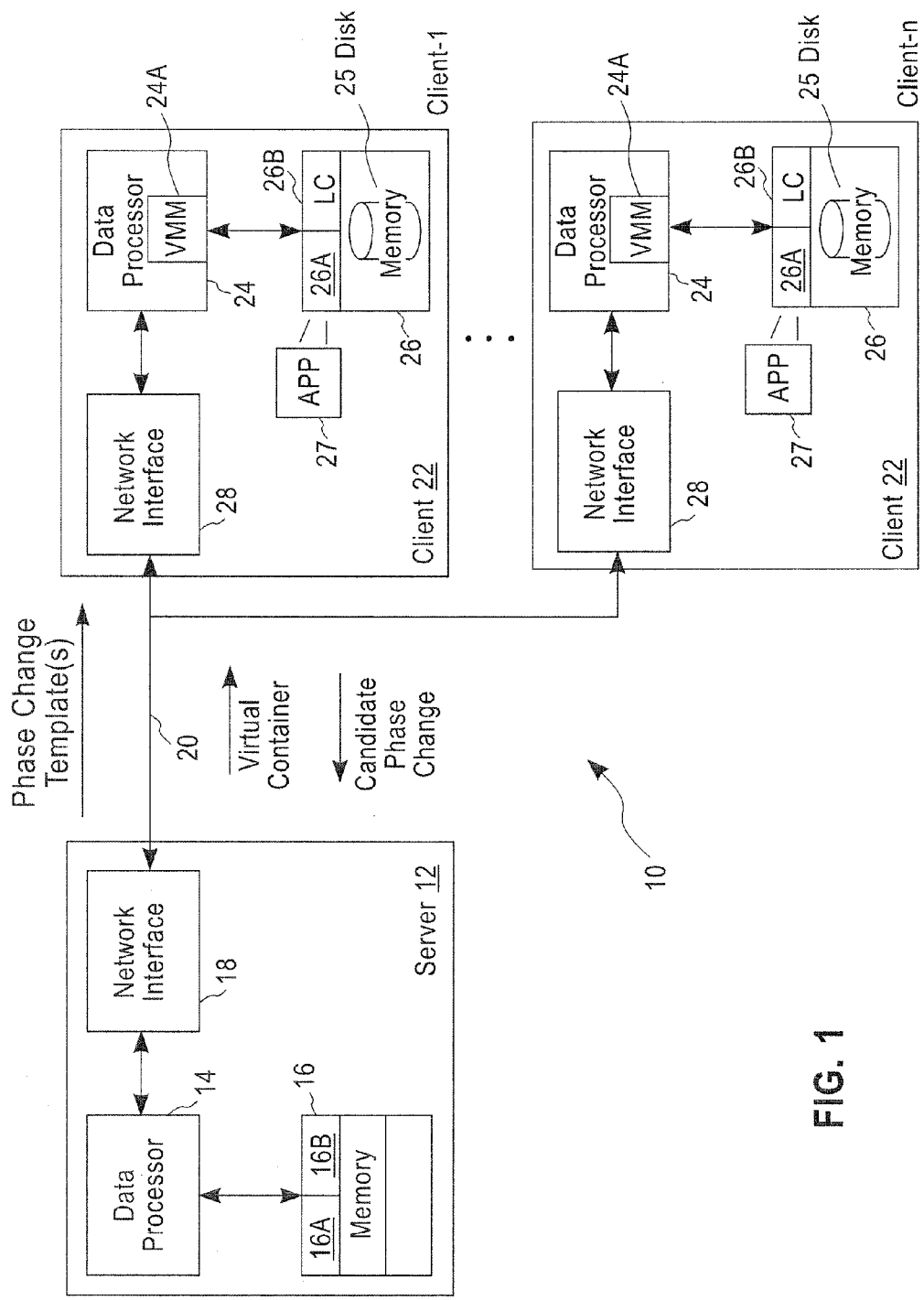
FIG. 1 is a system level block diagram of a virtualization environment containing a server and a plurality of clients that operate in accordance with exemplary embodiments of this invention.

FIG. 1 is a block diagram of a data processing system embodying a virtualization environment 10 that is suitable for use in implementing the exemplary embodiments of this invention. System 10 includes a server 12 that includes at least one control unit, such as at least one data processor 14 that is bidirectionally coupled to a memory 16. The memory 16 may be based on any suitable memory technology, and may include one or more magnetic rotating memory or tape memory, optical memory and semiconductor-based memory, as non-limiting examples. The memory 16 may be viewed as a tangible, computer-readable storage medium that stores data representing at least a computer program 16A containing program instructions for operating the data processor 14 to implement aspects of this invention, as well as data 16B for use by the data processor 14 when executing the methods of this invention. The memory 16 may store, such as in data area 16B, components that may be prefetched by applications running in clients 22. The server 12 also includes a network interface 18 for bidirectionally coupling to at least one data communication network 20. Also coupled to the network 20 is at least one, and typically a plurality of the clients 22 (client_1, . . . client_n). Each client 22 may be assumed to also include at least one data processor 24 that is bidirectionally coupled to a memory 26, as well as a corresponding network interface 28. The memory 26 is assumed to include a computer program 26A implementing at least one application 27 that executes in a virtualized environment. The memory 26 can be assumed to include at least one rotating disk type of memory (disk) 25. The disk 25 can be assumed to include, or be operatively connected with, a suitable disk controller (not shown), and possibly also with a cache memory (not shown) for storing data being written to and read from the disk 25.

The data processor 24 can be assumed to implement a virtual machine monitor (VMM) 24A functionality responsible for executing the virtual container within which the application 27 is executed.

In some embodiments the server 12 may be a server of the components of applications 27 executed by the clients 22, and to be responsible for providing components from the memory 16. In other embodiments the server 12 may not be present, and each client 22 (if there be more than one) can operate in a stand-alone, independent manner. The application 27 may be any suitable application, such as a data base application or an image rendering application, as non-limiting embodiments, that is suitable for being executed in a virtual machine-type of environment.

The exemplary embodiments of this invention enable the VMM 24A to employ dynamic file placement techniques so that the virtual container itself is enabled to order files on the disk(s) 25 of the host (client 22) file system. The virtual container is in a better position to construct phase change file sequences than is the operating system or a stand-alone user process.

Note that all or some of the virtual container may be brought in over the network 20 before it is needed (pre-fetched), or it may be brought in on demand, or it may be resident in the client 22.

In accordance with exemplary embodiments of this invention it is assumed that contemporaneous file accesses originating from processes within the virtual container are likely to be causally related. Similarly, contemporaneous file accesses from one process within the container, and another from outside the container, are considered coincidental (i.e., not causally related). Phase change templates derived during, for example, testing or execution of the application on other client machines may also be consulted. The server 12 in this case may provide a client 22 virtual container with a template or templates for known phase change file sequences, where a template may identify a particular phase change, and contains a list of files requiring access at the time the phase change occurs. However, if the VMM 24A of the client 22 executing the container observes a file access sequence that does not appear in the template or templates it may send information descriptive of the sequence to the server 12. In response, the server 12 may apply static analysis techniques to determine if the sequence was coincidental, or a heretofore undiscovered phase change file sequence. In the latter case, it may derive a phase change template for the sequence, or revise an existing phase change template, and distribute it to the clients 22.

Static analysis is a technique known in the art for obtaining information about the possible states that a program passes through during execution, without actually running the program on specific inputs. A static analysis procedure analyzes a program's behavior for all possible inputs and all possible states that the program can reach. To this end the program is "run in the aggregate", i.e., on abstract descriptors that represent collections of many states. Static analysis can be used to determine whether a program can reach an undesirable state that may compromise the usefulness of the program.

Non-limiting examples of various publications related to static analysis include the following:

Steven S. Muchnick, Advanced Compiler Design and Implementation. Morgan Kaufnan Publishers, 1997;

Patrick Cousot and Radhia Cousot, Basic Concepts of Abstract Interpretation. In Building the Information Society, RenéJacquard (Ed.), Kluwer Academic Publishers, pp. 359-366, 2004;

Benjamin C. Pierce, Types and Programming Languages. The MIT Press, 2002; and

Edmund M. Clarke Jr., Oma Grumberg, and Doron A. Peled, Model Checking, The MIT Press, 1999.

Figure 2:
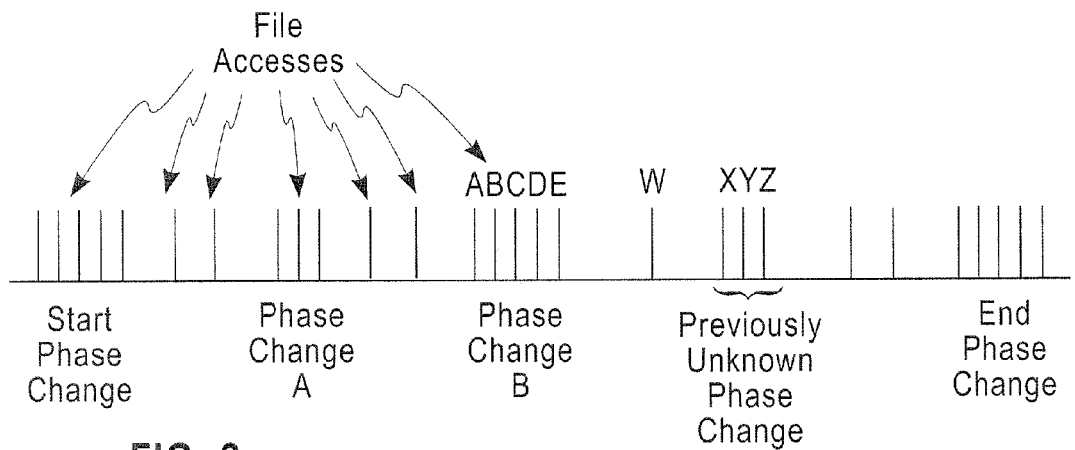
FIG. 2 is a graphical depiction of an exemplary execution by the VMM of FIG. 1 of a virtual container and depicts several phase changes, each associated with some number of essentially contemporaneous file accesses to a disk.

FIG. 2 is a graphical depiction of the execution by the VMM 24A of the virtual container containing the application 27. Note that several phase changes are indicated, each associated with some number of essentially contemporaneous file accesses to the disk 25. In this non-limiting example there is shown an application Start phase change and an application End phase change, as well as two intermediate phase changes A and B. Other file accesses may typically occur that are not specifically associated with a phase change. FIG. 2 also shows an occurrence of a previously unknown (candidate) phase change (e.g., one not previously indicated in a phase change template sent from the server 12 to the client 22) that is detected by the VMM 24A by the presence of some threshold number of file accesses that occur within some predetermined period of time (e.g., 5 milliseconds). In this case the client 22 (the VMM 24A) may inform the server 12 of the existence of this detected (candidate) phase change, as well as the identity of the files (x, y, z) accessed therein. It may also be useful to inform the server 12 of the identity of a file (or files) accessed prior to the previously undetected phase change (file w in this case), which may be used to implement a prefetch trigger for the files x, y, z, especially if the presence of the preceding file w is found in multiple instances of this previously undetected phase change by the VMM 24A in one or more of the clients 22. In response to being informed of the presence of the previously undetected phase change the server 12 may create, revise and/or update the phase change template, as was discussed above, such as a result of performing a static analysis technique.

Figure 3:
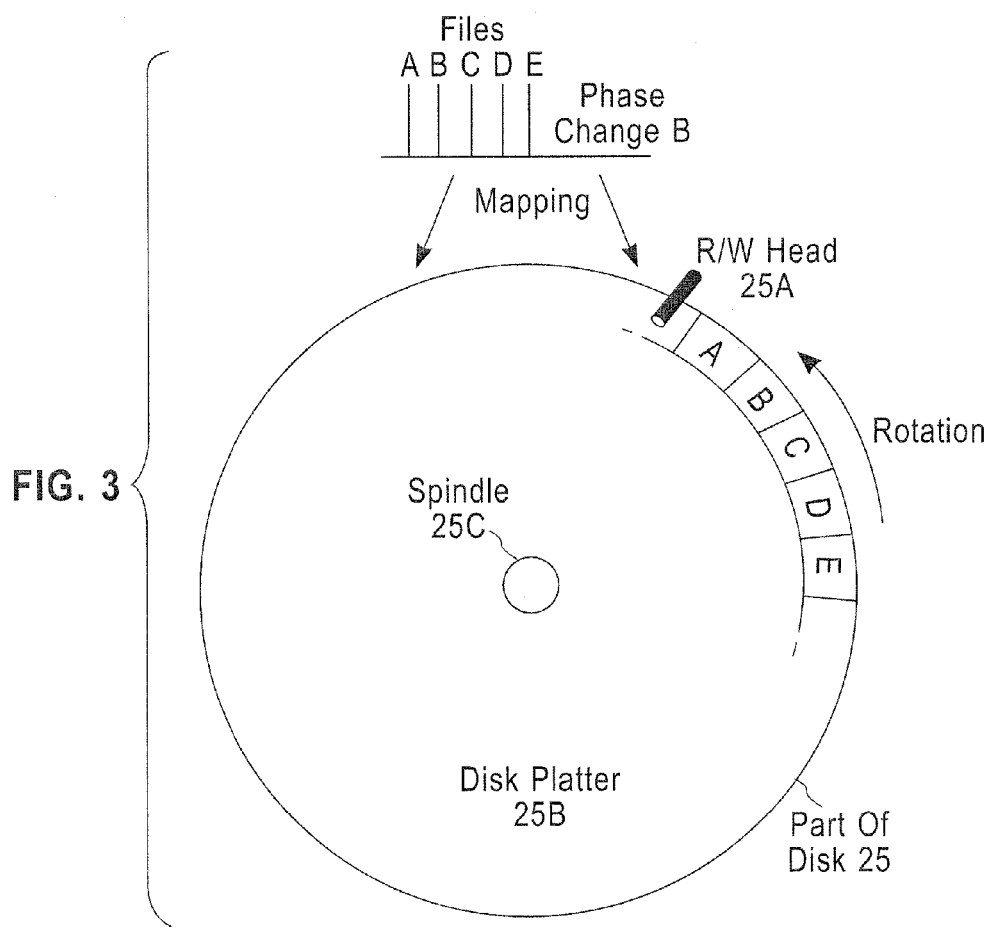
FIG. 3 is an example of a mapping of files A, B, C, D, E from the phase change B of FIG. 2 to the disk.

FIG. 3 is an example of the mapping of the files A, B, C, D, E from the phase change B to the disk 25. In this simple example the files are mapped (stored) in consecutive order (in order of access) on a single platter 25B of the disk 25, such that they pass under a read/write (R/W) head 25A in the ordered sequence needed, thereby reducing disk latency and increasing the disk transfer rate. Furthermore, the files are shown as being stored at or near an outer edge of the disk platter 25B where the relative velocity is greater than it would be a location nearer to the spindle 25C. Of course, in multiple platter, multiple R/W head types of disks other physical arrangements of the files A, B, C, D, E may be advantageous (e.g., they may be stored across multiple platters), as is known in the art. However, in any case the files are intentionally positioned on the physical storage medium to minimize the time required to access the files at the occurrence of a phase change, or prior to the occurrence of a phase change if the files are prefetched, thereby increasing the speed of execution of the virtual application 27.

Note that the disk 25 may be embodied as a single disk drive, or as a plurality of disk drives, or as an array of disk drives such as those known as a redundant array of inexpensive (or independent) disks (RAID). One exemplary and non-limiting RAID system is described in commonly owned U.S. Pat. No. 7,191,285, Scales et al., "Configuring Memory for a RAID Storage System". In this case the optimization of the placement of the files for achieving fast consecutive access can be achieved by (as non-limiting examples) possibly setting the RAID level and/or striping characteristics of the RAID configuration, as would be known to one skilled in the art.

In any of these embodiments the goal is to achieve a placement of the files needed for a phase change on a physical storage medium so as to optimize (minimize) the time needed to access and obtain the files. Note that the files may be read-only or read-write files.

It should be noted as well that a particular file may be accessed by more than one phase change. In this case multiple instances of the file may be provided, one for each region of the physical storage medium that stores those files needed by a particular one of the phase changes. This approach is particularly well suited for read-only files. However, for a commonly-accessed read-write file it may be desirable to provide only one instance of the particular file, and thereby incur some reduction in access time for one or more of the phase changes that require the read-write file. Alternatively, multiple instances of the read-write file may be provided (e.g., one for each phase change that accesses the file), in combination with an intelligent memory management/cache technique to ensure that data written during execution of the file during one phase change is reflected into the other instances of the file, prior to it being accessed for use by another phase change.

Figure 4:
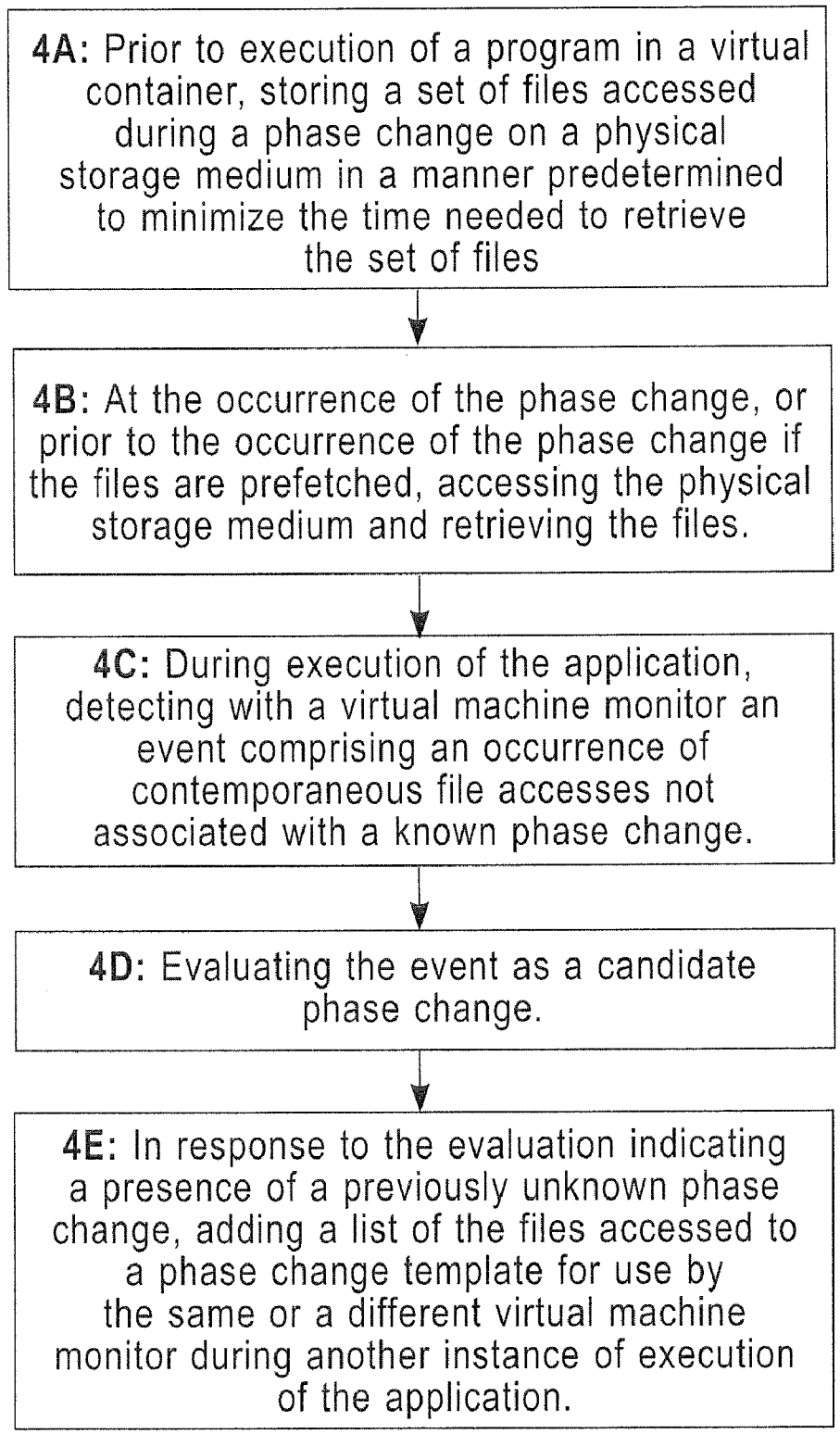
FIG. 4 is a logic flow diagram that is illustrative of a method, and an operation of a computer program, in accordance with exemplary embodiments of this invention.

FIG. 4 is a logic flow diagram that is illustrative of a method, and an operation of a computer program, in accordance with exemplary embodiments of this invention. Based on the foregoing description it can be appreciated that the method includes, (Block 4A) prior to execution of a program in a virtual container, storing (recording) a set of files accessed during a phase change on a physical storage medium in a manner predetermined to minimize the time needed to retrieve the set of files; and (Block 4B) at the occurrence of the phase change, or prior to the occurrence of a phase change if the files are prefetched, accessing the physical storage medium and retrieving the files.

The method as described above, and further comprising, (Block 4C) during execution of the application, detecting with a virtual machine monitor an event comprising an occurrence of contemporaneous file accesses not associated with a known phase change; and (Block 4D) evaluating the event as a candidate phase change. The method further includes, (Block 4E) in response to the evaluation indicating a presence of a previously unknown phase change, adding the list of the files accessed to a phase change template for use by the same or a different virtual machine monitor during another instance of execution of the application.

In the foregoing method the set of files may be identified in a phase change template received from a server.

In the foregoing method individual files of the set of files are stored in the order that they are accessed at the phase change.

In the foregoing method the physical storage medium may comprise at least one disk.

It should be appreciated that the exemplary embodiments discussed above can be used in a number of virtualization embodiments and architectures, and is not limited for use in the one described above and shown in FIG. 1. In addition, the exemplary embodiments are well suited for use in systems similar to or based on the above-referenced PDS, which is a virtual execution environment and infrastructure designed specifically for deploying software, or "assets", on demand while enabling management from a central location. PDS intercepts a select subset of system calls on a target machine to provide a partial virtualization at the operating system level. This enables an asset's install-time environment to be reproduced virtually while otherwise not isolating the asset from peer applications on the target machine. Asset components, or "shards", are fetched as they are needed (or they may be pre-fetched), enabling the asset to be progressively deployed by overlapping deployment with execution. Cryptographic digests, or some other mechanism, are used to eliminate redundant shards within and among assets, which enables more efficient deployment. A framework is provided for intercepting interfaces above the operating system (e.g., Java class loading), enabling optimizations requiring semantic awareness not present at the OS level.

Reference may also be made to U.S. Patent Application No.: 2006/0047974, incorporated by reference herein.

The foregoing description has provided by way of exemplary and non-limiting examples a full and informative description of the exemplary embodiments of this invention. However, various modifications and adaptations may become apparent to those skilled in the relevant arts in view of the foregoing description, when read in conjunction with the accompanying drawings and the appended claims. As but one example, the server 12 may use a technique other than static analysis when presented with a candidate phase change by a VMM 24A, or it may use static analysis in combination with another technique, such as dynamic analysis of the program. However, all modifications of the teachings of this invention will still fall within the scope of the embodiments of this invention.

Further, as employed herein "recording" is intended to encompass any technique for placing data onto a data storage medium including, but not limited to, magnetic recording and optical recording techniques.

Furthermore, some of the features of the preferred embodiments of this invention may be used to advantage without the corresponding use of other features. As such, the foregoing description should be considered as merely illustrative of the principles, teachings and embodiments of this invention, and not in limitation thereof.

What is claimed is:

1. A method, comprising:

prior to execution of a program in a virtual container, recording a set of files accessed during a phase change of the program on a physical storage medium in a manner predetermined to minimize the time needed to retrieve the set of files, wherein a virtual machine monitor executes the virtual container within which the program is executed; and during execution of the program in the virtual container, accessing the physical storage medium and retrieving the files at one of an occurrence of the phase change, and, if the files are prefetched, prior to the occurrence of the phase change;

during execution of the program in the virtual container, detecting with the virtual machine monitor an event comprising an occurrence of contemporaneous file accesses not associated with a known phase change, wherein detecting with the virtual machine monitor an event further comprises detecting contemporaneous file accesses originating from at least two processes within the virtual container or from at least one process within the virtual container and at least one process outside the container; and evaluating the event as a candidate phase change, wherein evaluating further comprises determining the contemporaneous file accesses originating from at least two processes are related and determining the contemporaneous file accesses originating from at least one process within the virtual container and at least one process outside the container are not related, and using information about relationships of the contemporaneous file accesses in order to evaluate the contemporaneous file accesses as the candidate phase change.

2. The method of claim 1, where the set of files are identified in a phase change template received from a server.

3. The method of claim 1, where individual files of the set of files are recorded in the order that they are accessed at the phase change.

4. The method of claim 1, where the physical storage medium comprises at least one disk.

5. The method of claim 1, in response to the evaluation indicating a presence of a previously unknown phase change, adding a list of the files accessed to a phase change template for use by the same or a different virtual machine monitor during another instance of execution of the program.

6. A tangible computer-readable storage medium storing data representing program instructions, the execution of which result in operations comprising:

prior to execution of a program in a virtual container, recording a set of files accessed during a phase change of the program on a physical storage medium in a manner predetermined to minimize the time needed to retrieve the set of files wherein a virtual machine monitor executes the virtual container within which the program is executed; and during execution of the program in the virtual container, accessing the physical storage medium and retrieving the files at one of an occurrence of the phase change, and if the files are prefetched, prior to the occurrence of the phase change during execution of the program in the virtual container, detecting with the virtual machine monitor an event comprising an occurrence of contemporaneous file accesses not associated with a known phase change, wherein detecting with the virtual machine monitor an event further comprises detecting contemporaneous file accesses originating from at least two processes within the virtual container or from at least one process within the virtual container and at least one process outside the container; and evaluating the event as a candidate phase change, wherein evaluating further comprises determining the contemporaneous file accesses originating from at least two processes are related and determining the contemporaneous file accesses originating from at least one process within the virtual container and at least one process outside the container are not related, and using information about relationships of the contemporaneous file accesses in order to evaluate the contemporaneous file accesses as the candidate phase change.

7. The tangible computer-readable storage medium of claim 6, where the set of files are identified in a phase change template received from a server.

8. The tangible computer-readable storage medium of claim 6, where individual files of the set of files are stored in the order that they are accessed at the phase change.

9. The tangible computer-readable storage medium of claim 6, where the physical storage medium comprises at least one disk.

10. The tangible computer-readable storage medium of claim 6, in response to the evaluation indicating a presence of a previously unknown phase change, adding a list of the files accessed to a phase change template for use by the same or a different virtual machine monitor during another instance of execution of the program.

11. The tangible computer-readable storage medium of claim 10, where the operations of evaluating and adding occur at a server that is coupled to the virtual machine monitor through a communications network.

12. A data processor, comprising:

a disk-based storage system; and a virtual machine monitor configured to execute a program in a virtual container, the virtual container also executed by the virtual machine monitor, said virtual machine monitor responsive, prior to execution of the program, to record a set of files accessed during a phase change by the program in the disk-based storage system in a manner predetermined to minimize the time needed to retrieve the set of files, and further responsive during execution of the program in the virtual container to retrieve the files from the disk-based storage system at one of an occurrence of the phase change, and, if the files are prefetched, prior to the occurrence of the phase change;

during execution of the program in the virtual container, detecting with the virtual machine monitor an event comprising an occurrence of contemporaneous file accesses not associated with a known phase change, wherein detecting with the virtual machine monitor an event further comprises detecting contemporaneous file accesses originating from at least two processes within the virtual container or from at least one process within the virtual container and at least one process outside the container; and evaluating the event as a candidate phase change, wherein evaluating further comprises determining the contemporaneous file accesses originating from at least two processes are related and determining the contemporaneous file accesses originating from at least one process within the virtual container and at least one process outside the container are not related, and using information about relationships of the contemporaneous file accesses in order to evaluate the contemporaneous file accesses as the candidate phase change.

13. The data processor of claim 12, further comprising a network interface for conducting bidirectional communications with a server, where the set of files are identified in a phase change template received from the server.

14. The data processor of claim 12, where individual files of the set of files are stored in the order that they are accessed at the phase change.

15. The data processor of claim 13, where said virtual machine monitor is configured to send information regarding the event to the server as the candidate phase change.

16. The data processor of claim 12, where said server is configured, in response to the evaluation indicating a presence of a previously unknown phase change, to add a list of the files accessed to a phase change template for use by the same or a different virtual machine monitor during another instance of execution of the program.

17. A method, comprising:

prior to execution of a program in a virtual container, recording a set of files accessed during a phase change of the program on a physical storage medium in a manner predetermined to minimize the time needed to retrieve the set of files, wherein a virtual machine monitor executes the virtual container within which the program is executed;

during execution of the program in the virtual container, accessing the physical storage medium and retrieving the files at one of an occurrence of the phase change, and, if the files are prefetched, prior to the occurrence of the phase change;

fetching a plurality of software components at a predetermined time;

during execution of the program in the virtual container, detecting with the virtual machine monitor an event comprising an occurrence of contemporaneous file accesses not associated with a known phase change, wherein detecting with the virtual machine monitor an event further comprises detecting contemporaneous file accesses originating from at least two processes within the virtual container or from at least one process within the virtual container and at least one process outside the container;

evaluating the event as a candidate phase change, wherein evaluating further comprises determining the contemporaneous file accesses originating from at least two processes are related and determining the contemporaneous file accesses originating from at least one process within the virtual container and at least one process outside the container are not related, and using information about relationships of the contemporaneous file accesses in order to evaluate the contemporaneous file accesses as the candidate phase change;

deploying the plurality of software components wherein a deployment of the plurality of software components overlaps an execution of the plurality of software components;

using a cryptographic digest to eliminate a redundant software component from the plurality of software components; and providing an intercepting interface above an operating system.

* * * * *